Jan. 11, 1938.　　　A. L. SCHUYLER　　　2,105,099
METHOD OF MANUFACTURING KEYS
Filed Aug. 31, 1935
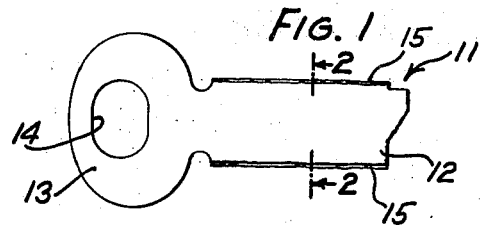
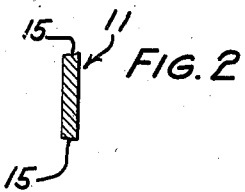
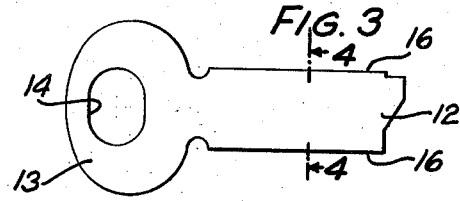
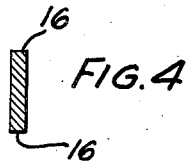
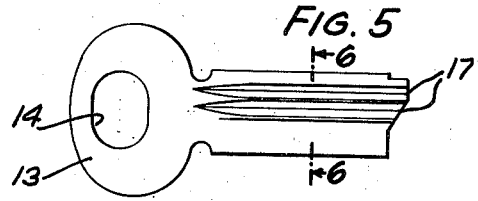
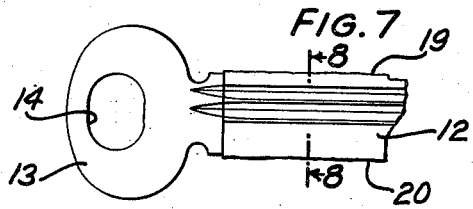
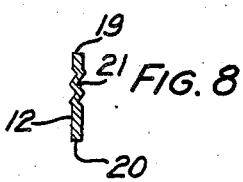
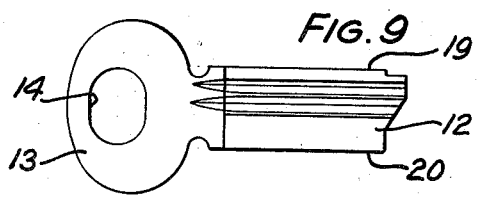
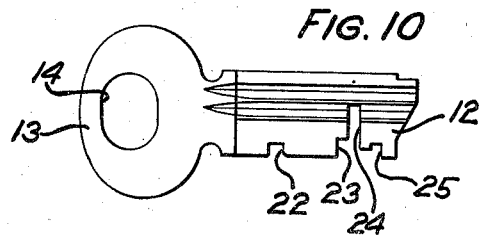
INVENTOR
A. L. SCHUYLER
BY H. A. Whitehorn
ATTORNEY Patented Jan. 11, 1938

2,105,099

UNITED STATES PATENT OFFICE 2,105,099

METHOD OF MANUFACTURING KEYS

Andrew L. Schuyler, La Grange, Ill., assignor to Western Electric Company, Incorporated, New York, N. Y., a corporation of New York Application August 31, 1935, Serial No. 38,703

2 Claims. (Cl. 76—110)

This invention relates to a method of manufacturing keys, and more particularly to keys for rotor center tumbler type locks.

The object of the present invention is a method of producing a strong and accurately formed key or similar article.

In accordance with one embodiment of the invention, a key blank is formed from sheet metal stock and the flutings are milled therein to approximately the desired depth and then a swaging operation is performed on the key shank to accurately form the key to the desired dimension and simultaneously form a tough, work hardened skin on the shank of the key whereupon the code notches are cut in the shank.

A better understanding of the invention may be had by reference to the accompanying drawing, wherein Figs. 1 and 2 are illustrative of the first step of the proposed method and show in plan and section, respectively, a blank punched from sheet metal stock;

Figs. 3 and 4 show the blank in plan and section, respectively, after the rough edges formed in the blanking operation have been trimmed from the sides of the shank of the key;

Figs. 5 and 6 show in plan and section, respectively, a key blank after the flutings have been milled therein;

Figs. 7 and 8 in plan and section, respectively, show the key blank after the shank has been swaged;

Fig. 9 shows a plan view of a key blank from the edges of which the excess material displaced in the swaging operation has been trimmed, and Fig. 10 shows a plan view of the finally formed key with the code notches cut therein.

Referring now to the drawing, and particularly to Figs. 1 and 2, a key blank indicated generally by the numeral 11 is stamped from sheet metal stock having a shank 12, and a bow 13 in which an aperture 14 is punched. The blank 11 will have rough edges 15 formed thereon in the stamping operation, which must be trimmed before the edges may be used as gauging surfaces to accurately position the flutings to be formed in the shank. Accordingly, after the blank 11 has been stamped from the sheet metal stock the edges of the shank 12 must be trimmed to straighten and square them as shown in Figs. 3 and 4 at 16. This trimming operation is performed by shaving the rough edges off in a punch press equipped with shaving tools.

The next step in the production of the key is a milling operation wherein the shank 12 is milled to the shape shown in Figs. 5 and 6 in a suitable milling device. In this operation grooves 17 and 18 are cut in opposite sides of the shank leaving the metal just slightly greater in cross section than it should be in the finally formed key.

In keys of the type manufactured in accordance with the present invention, which are designed for use in locks of the type illustrated in the patent to O. A. Shann Patent No. 1,793,254 issued February 17, 1931, the shank 12 must have great strength and resistance to bending stress. The keys must also be as thin as possible to fit a lock, having a narrow undulating slot in its center for preventing the insertion therein of other than the proper keys, and therefore the key shank 12 is reduced to its final thickness by a swaging operation. This swaging operation is illustrated in Figs. 7 and 8 wherein a portion of material as shown at 19 and 20 is swaged out of its original position when the shank 12 is reduced to the desired thickness. It will be noted by a comparison of Figs. 6 and 8 that the shank 12 in its undulating portion has the thickness of the flutings reduced as shown at 21. This swaging operation tends to work harden the surface of the shank by compressing and moving the molecules which form the structure of the shank and the swaging therefore tends to strengthen the shank of the key to an appreciable extent. The swaging operation is preferably performed by a pair of cooperating dies having surfaces complementary to the desired final surfaces of the key. The dies may be forced together by any suitable means such as a press.

After the swaging operation as illustrated in Figs. 7 and 8 has been completed, the rough edges as indicated at 19 and 20 must be straightened and smoothed to provide a straight, square gauging surface along the edge of the key shank for locating the code notches to be cut therein; accordingly, the shank of the key is again subjected to a shaving operation to remove the rough edges at 19 and 20 and produce a fluted key blank such as that shown in Fig. 9. After the edges 19 and 20 have been trimmed, the key is ready to be cut with code notches and accordingly notches such as those shown at 22, 23, 24 and 25 are milled in the key and the key is ready for use, after a tumbling operation which removes the burrs formed in milling the code notches in the lower edge (Fig. 10) of the key shank 12.

What is claimed is:

1. A method of forming keys for rotor center tumbler type locks which comprises forming a blank of a predetermined contour from sheet metal stock, milling grooves in opposite surfaces of the blank, and cold swaging the grooved portion of the key to the desired thicknesses.

2. A method of forming keys for rotor center tumbler type locks which comprises punching a blank having a bow portion and a shank portion from sheet metal stock, trimming the edges of the shank, milling grooves in opposite surfaces of the shank, cold swaging the shank to reduce the thickness thereof and to deepen the grooves formed therein, again trimming the edges of the shank to provide a gauging surface, and milling code notches predetermined distances into the shank from the trimmed edges.

ANDREW L. SCHUYLER.